(No Model.)
M. THONAR.
PULLEY GUIDE FOR ROPES.
Patented Sept. 22, 1896.
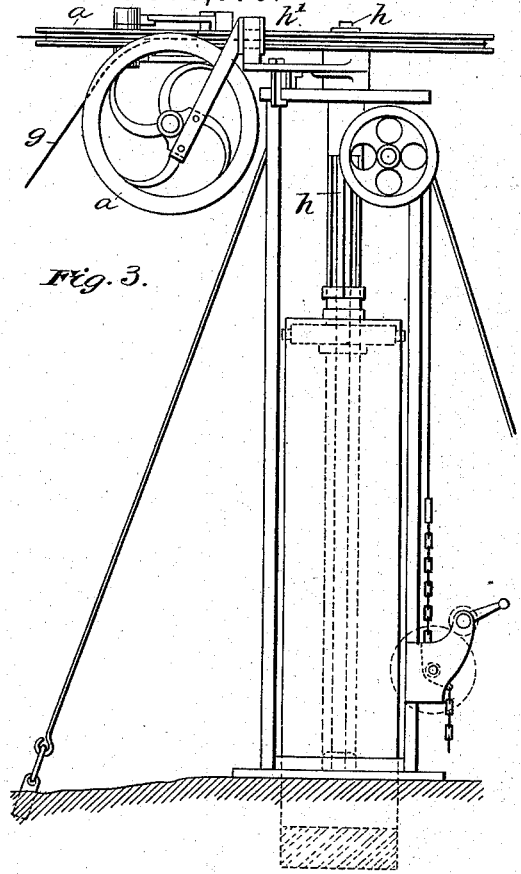
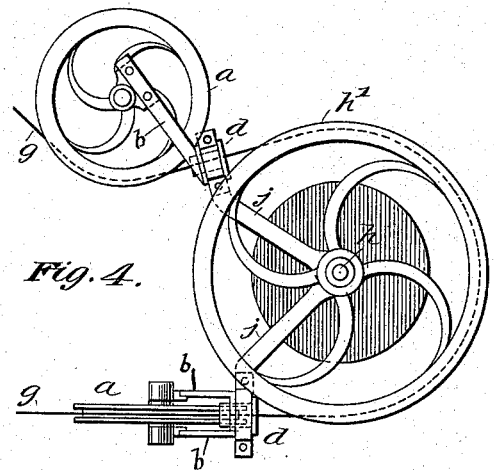
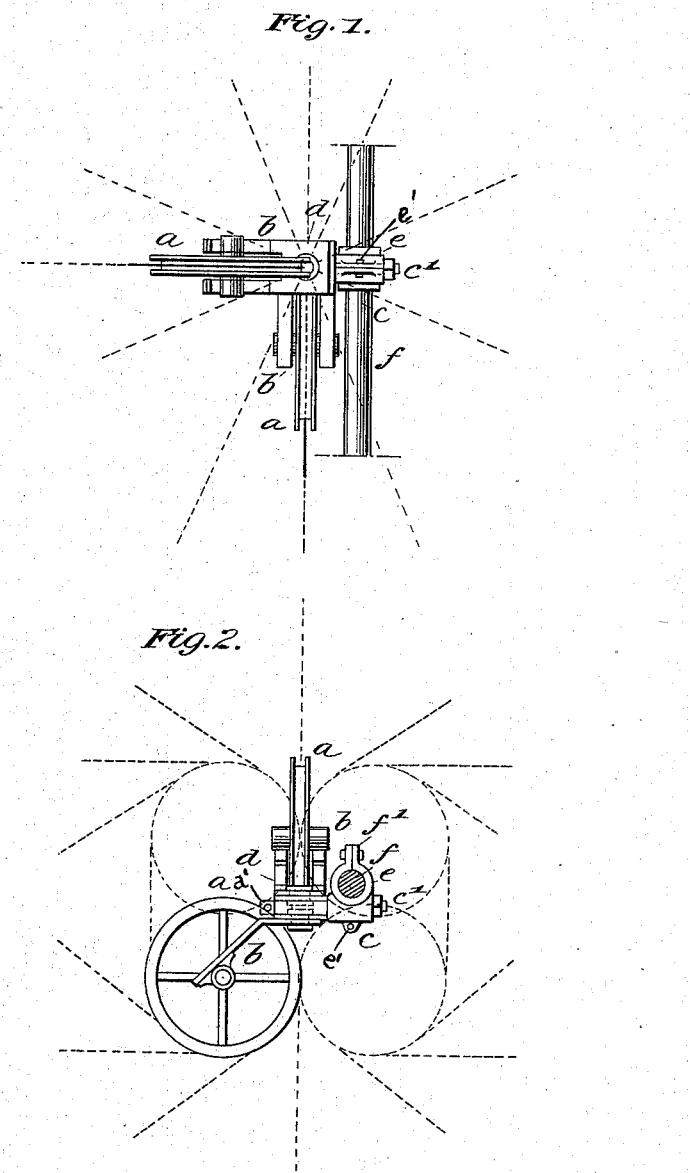
WITNESSES:
INVENTOR
Michel Thonar
ATTORNEYS

United States Patent Office.

MICHEL THONAR, OF NAMUR, BELGIUM, ASSIGNOR, BY MESNE ASSIGNMENTS, TO BATTERSON & EISELE, OF NEW YORK, N. Y.

PULLEY-GUIDE FOR ROPES.

SPECIFICATION forming part of Letters Patent No. 568,076, dated September 22, 1896.

Application filed July 2, 1894. Serial No. 516,378. (No model.) Patented in Belgium August 31, 1883, No. 62,371, and September 30, 1884, No. 66,355; in France August 7, 1884, No. 163,676; in England August 8, 1884, No. 11,073, and in Austria-Hungary July 1, 1885, No. 12,496 and No. 36,242.

*To all whom it may concern:*

Be it known that I, MICHEL THONAR, a subject of the King of Belgium, residing at Namur, in the Kingdom of Belgium, have invented certain new and useful Improvements in Pulley-Guides for Ropes, &c., (Case A,) of which the following is a specification.

Letters Patent upon this invention have been granted to me in the following-named foreign countries: Belgium, No. 62,371, dated August 31, 1883, and No. 66,355, dated September 30, 1884; France, No. 163,676, dated August 7, 1884; Great Britain, No. 11,073, dated August 8, 1884, and Austria-Hungary, No. 12,496 and No. 36,242, dated July 1, 1885.

This invention relates to guide-supporting devices for cables, wires, or bands, such as driving ropes or bands and sawing-wires, and has for its object the construction of a simple and cheap support for guide-pulleys adapted to be set and clamped in any desired position, so that the pulleys will properly receive and deliver the rope, wire, or band in whatever direction the rope, wire, or band may be moving or that it is desired that it shall move.

The essential feature of my invention is a supporting arm or frame for a guide-pulley having a journal or pivot by which it is held in another frame and by which it may be set in any angular position, the axis of said journal or pivot being a tangent to the pulley carried by the adjustable arm or frame.

Various combinations may be made of my improved guide-pulley supports, some few of which are illustrated in the accompanying drawings, to which I will now refer.

Figure 1 is a side view of two pulley-supports arranged on a post and fully showing the nature of my invention. Fig. 2 is a plan view of the same. Fig. 3 illustrates the application of my invention to a machine having a vertical driving-shaft. Fig. 4 is a plan of the same.

The description of one of the adjustable pulley-supports applies to all of the applications of my invention shown in the drawings, so the corresponding parts, which in some cases are slightly modified in form, are similarly lettered.

Referring now to Figs. 1 and 2, the pulleys *a a* are by suitable bearings and journals carried at the ends of the arms or frames *b b*. The other ends of these arms *b b* are connected to the supporting frame or block *c* by suitable bearings or pivotal connections *d d*, so that said arms may be moved around through an entire circle and be clamped and held in any desired angular position. The pulleys *a a* are so located in relation to these pivotal connections of the arms *b b* that a tangent of each pulley is on or coincides with the axis of the pivotal connection of its supporting-arm, thereby insuring the rope or wire which passes around the pulleys, and which passes through a hole formed through the pivotal connection also coincident with its axis, running properly on or off the pulley, according to the direction of its travel.

The frame or part *c* is composed of a split circular ring with a bolt and nut *d'* passing through lugs at the split opening for contracting the circular bearing and a stud or journal whose axis is at right angles to the axis of the circular bearing in line with the split opening, said journal being provided with a nut *c'* at its end. Each of the pulley-frames *b* has a grooved circular projection or journal centrally perforated and fitted to turn in the circular bearing of *c* to form the pivotal connections *d d*, said journals of the frames *b b* being seated in opposite sides of the part *c*, so as to be held thereto, but free to rotate in the bearing, the function of the bolt and nut *d'* being to firmly hold the frames *b b* in any position in which they may be set by clamping the circular bearing of the part *c* onto the grooved journals of the frames *b b*. The stud or journal of the part *c* is fitted to rotate in a split bearing in the sleeve *e*, which is closed onto so as to bind the journal of *c* by means of the bolt and nut *e'*. The nut *c'* holds the part *c* in its bearing of the sleeve *e*, and may be used to assist in locking in any position in which it may set relative to the sleeve *e*. This sleeve *e* has another split bearing arranged at right angles to the bearing of the part c, and adapted to embrace the post f to be set in any position in horizontal planes and at any height thereon, said sleeve when suitably set being firmly held onto the post by the bolt and nut f', which passes through lugs at the split opening of the sleeve.

The pivotal connection of the part c, the axis of which is at right angles to that of the pivotal connections of the arms b b permit of the two pulleys being locked in any angular position at right angles to the angles they be set in by reason of their individual pivotal connections. From this it is seen that a drive-rope or other traveling cord or wire may be directed to any point by this device, irrespective of the direction of its travel to the device. The radial dotted lines in Fig. 1 show a few of the directions in the vertical plane in which either the approaching or leaving part of the rope may travel to or from the device, and the dotted lines in Fig. 2 indicate a few of the directions of travel of the rope in a horizontal plane.

In Figs. 3 and 4 the driving power of an endless rope or band g is shown applied to the vertical shaft h of a rock boring or cutting machine, said rope being guided to and from the pulley h', secured to the top of the shaft h, by the pulleys a a, the pivots or journals d d of their carrying-arms b b being fitted and held in the outer ends of the arms j j, the inner ends of which are fitted on the hub of the bearing of the shaft h. The axes of the pivotal connections d d form tangents to the pulley h', as shown in Fig. 4, so that rope will be truly guided to and from the pulley h' in whatever horizontal angular position the arms j j may be placed and in whatever vertical angular position the pulleys a a have to assume to agree with the direction of travel of the rope.

I claim as my invention—

1. In a guiding device for cables, ropes or bands, the combination of a support, two arms pivotally connected thereto on opposite sides of the support on a common axis, which axis coincides with that of a hole formed through the pivotal connections and the support, and a pulley carried by each arm and so arranged that a tangent common to the two pulleys is coincident with the axis of the pivotal connection.

2. In a guiding device for cables, ropes or bands, the combination of a support, two arms pivotally connected thereto on opposite sides of the support on a common axis, which axis coincides with that of a hole formed through the pivotal connections and the support, a pulley carried by each arm and so arranged that a tangent common to the two pulleys is coincident with the axis of the pivotal connection, and clamping devices for locking the pivotal connections.

3. In a guiding device for cables, ropes or bands, the combination of a support, two arms pivotally connected thereto on opposite sides of the support on a common axis, which axis coincides with that of a hole formed through the pivotal connections and the support, a pulley carried by each arm and so arranged that a tangent common to the two pulleys is coincident with the axis of the pivotal connection, a holding-post, an adjustable sleeve on this post, and a pivotal connection between this sleeve and the support, arranged at right angles to the pivotal connections of the arms carrying the pulleys.

4. In a guiding device for cables, ropes or bands, the combination of a support, two arms pivotally connected thereto on opposite sides of the support on a common axis, which axis coincides with that of a hole formed through the pivotal connections and the supports, a pulley carried by each arm and so arranged that a tangent common to the two pulleys is coincident with the axis of the pivotal connection, clamping devices for locking the pivotal connections, a holding-post, an adjustable sleeve on this post, and a pivotal connection between this sleeve and the support, arranged at right angles to the pivotal connections of the arms carrying the pulleys.

5. In a guiding device for cables, ropes or bands, the combination of the driving-shaft of a machine and a pulley secured thereto, two frames at the side of this driving-pulley and adapted to be set in different angular positions, an arm fastened to the outer ends of each of these frames by pivotal connections axially perforated and whose axes are coincident with tangents of the driving-pulley, and a guide-pulley carried by each arm so arranged that the axis of the pivotal connection of each arm coincides with a tangent of the pulley carried by it.

6. In a guiding device for cables, ropes or bands, the combination of the driving-shaft of a machine and a pulley secured thereto, two frames at the side of this driving-pulley and adapted to be set in different angular positions, an arm fastened to the outer ends of each of these frames by pivotal connections axially perforated and whose axes are coincident with tangents of the driving-pulley, a guide-pulley carried by each arm so arranged that the axis of the pivotal connection of each arm coincides with a tangent of the pulley carried by it, and clamping devices for locking the arms in position on the frames and for locking the frames in set positions.

In testimony whereof I have signed this specification in the presence of two subscribing witnesses.

MICHEL THONAR.

Witnesses:
 GEORG BEDE,
 RENI SERBCST.